(12) United States Patent
Lu et al.

(10) Patent No.: US 12,719,076 B2
(45) Date of Patent: Aug. 25, 2026

(54) BATTERY CELLS WITH REDUCED TEARING OF OUTER CURRENT COLLECTORS ATTACHED USING ULTRASONIC WELDING

(71) Applicant: GM GLOBAL TECHNOLOGY OPERATIONS LLC, Detroit, MI (US)

(72) Inventors: Yong Lu, Shanghai (CN); Haijing Liu, Shanghai (CN); Teresa Jean Rinker, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 912 days.

(21) Appl. No.: 17/892,260

(22) Filed: Aug. 22, 2022

(65) Prior Publication Data

US 2024/0039032 A1 Feb. 1, 2024

(51) Int. Cl.
*H01M 10/04* (2006.01)
*H01M 50/536* (2021.01)
*H01M 50/538* (2021.01)

(52) U.S. Cl.
CPC ..... *H01M 10/0431* (2013.01); *H01M 50/536* (2021.01); *H01M 50/538* (2021.01)

(58) Field of Classification Search
CPC ........... H01M 10/0431; H01M 50/536; H01M 50/538; H01M 4/70; H01M 10/0413; H01M 10/0585; H01M 10/0587; H01M 4/13; H01M 10/0525; H01M 10/058; H01M 2220/20; Y02E 60/10; Y02P 70/50
See application file for complete search history.

(56) References Cited

U.S. PATENT DOCUMENTS

| | | | |
|---|---|---|---|
| 9,929,445 | B2 | 3/2018 | Yu et al. |
| 9,937,481 | B1 | 4/2018 | Liu et al. |
| 10,297,885 | B2 | 5/2019 | Gayden et al. |
| 10,319,978 | B2 | 6/2019 | Zeng et al. |
| 10,418,668 | B2 | 9/2019 | Wu et al. |
| 10,461,318 | B2 | 10/2019 | Zeng et al. |
| 10,597,783 | B2 | 3/2020 | Liu et al. |

(Continued)

FOREIGN PATENT DOCUMENTS

| | | | |
|---|---|---|---|
| CN | 102856577 | A | 1/2013 |
| CN | 106463761 | A | 2/2017 |

(Continued)

OTHER PUBLICATIONS

Office Action dated Apr. 24, 2023 from German Patent Office for German Patent Application No. 102022120826.5; 5 pages.

(Continued)

*Primary Examiner* — Matthew T Martin
*Assistant Examiner* — Bartholomew A Hornsby

(57) ABSTRACT

A battery cell includes a plurality of electrodes including a plurality of anode electrodes and a plurality of cathode electrodes. The plurality of electrodes is arranged in one of a stacked architecture and a winding architecture. Each of the plurality of electrodes includes a current collector and active material arranged on opposite sides of the current collector. The current collector of one or more outermost ones of the plurality of electrodes is thicker than the current collectors of remaining ones of the plurality of electrodes having the same anode/cathode type.

19 Claims, 7 Drawing Sheets

(56) References Cited

U.S. PATENT DOCUMENTS

| | | | | |
|---|---|---|---|---|
| 10,601,046 | B2 | 3/2020 | Yu et al. | |
| 10,658,663 | B2 | 5/2020 | Zhang et al. | |
| 10,665,852 | B2 | 5/2020 | Yu et al. | |
| 10,826,139 | B2 | 11/2020 | Rich et al. | |
| 10,944,100 | B2 | 3/2021 | Liu et al. | |
| 2013/0004827 | A1* | 1/2013 | Miyazaki | H01M 10/0525 429/153 |
| 2014/0079971 | A1* | 3/2014 | Huang | H01M 10/286 429/94 |
| 2017/0047575 | A1* | 2/2017 | Tsuji | H01M 4/04 |
| 2018/0287156 | A1* | 10/2018 | Yu | C09C 1/36 |
| 2019/0074510 | A1* | 3/2019 | Zhang | H01M 4/485 |
| 2020/0321648 | A1 | 10/2020 | Liu et al. | |
| 2021/0036385 | A1 | 2/2021 | Lu et al. | |
| 2021/0066711 | A1 | 3/2021 | Lu et al. | |

FOREIGN PATENT DOCUMENTS

| | | | | |
|---|---|---|---|---|
| KR | 20080107047 | A * | 12/2008 | H01M 50/534 |
| KR | 1020080107047 | A | 12/2008 | |

OTHER PUBLICATIONS

Office Action dated Apr. 2, 2026 from Chinese Patent Office for Chinese Patent Application No. 202210906185.7.

* cited by examiner

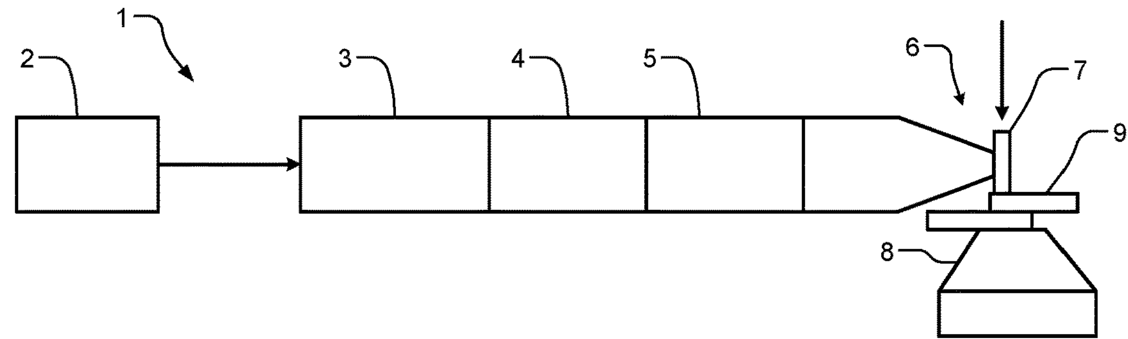
FIG. 1
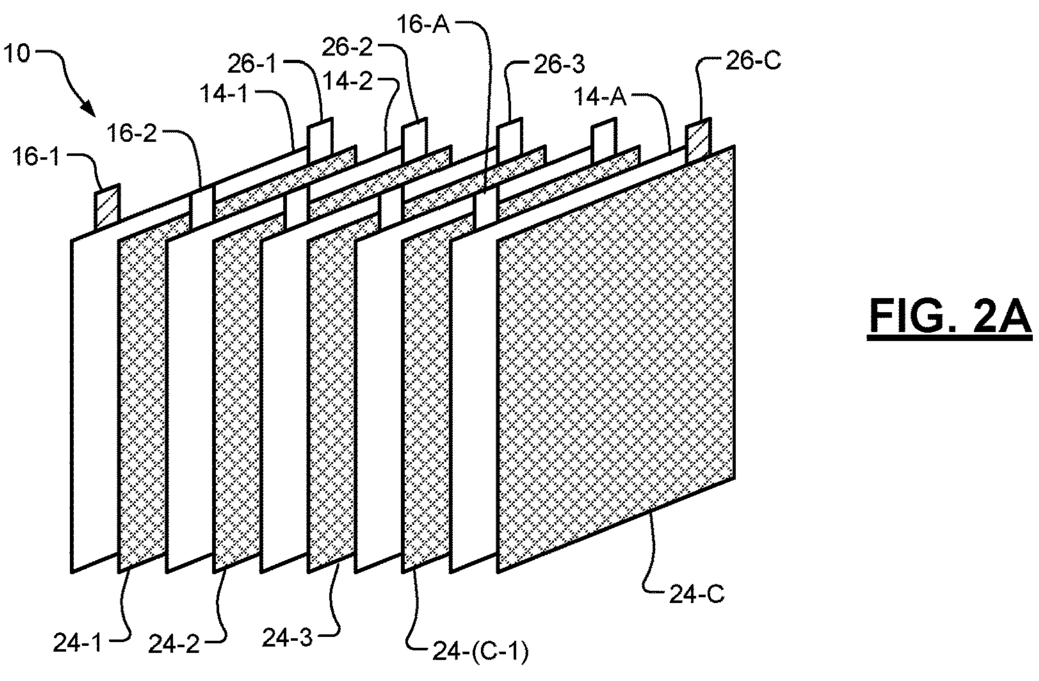
FIG. 2A
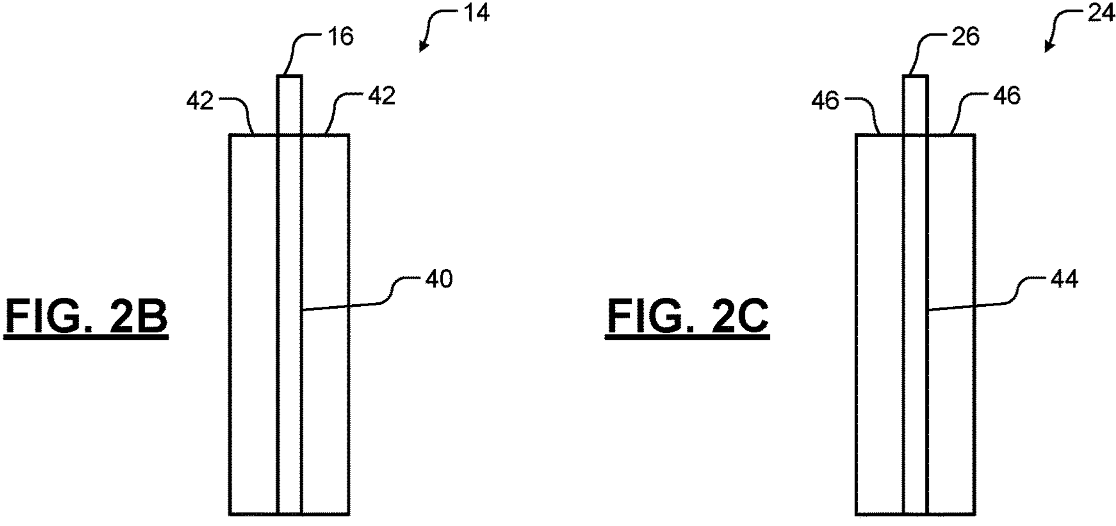
FIG. 2B
FIG. 2C

150

154-A
166-C
166-(C-1)
154-2
156-A
164-C
156-2
156-1
164-2
154-1
164-1
200
214-A
214-(A-1)
226-C
216-A
226-(C-1)
214-2
224-C
216-2
216-1
224-2

214-1
224-1

500

524-C
524-2
514-A
524-1
526-C
516-A
526-(C-1)
516-2
516-1
514-2
514-1

550

574-C
574-2
564-A
574-1
576-C
566-A
576-(C-1)
566-2
566-1
564-1
564-2

BATTERY CELLS WITH REDUCED TEARING OF OUTER CURRENT COLLECTORS ATTACHED USING ULTRASONIC WELDING

CROSS-REFERENCE TO RELATED APPLICATIONS

This application claims the benefit of Chinese Patent Application No. 202210906185.7, filed on Jul. 29, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to battery cells configured to reduce tearing of outer current collectors attached using ultrasonic welding.

Electric vehicles (EVs) such as battery electric vehicles (BEVs), hybrid vehicles, and/or fuel cell vehicles include one or more electric machines and a battery system including one or more battery cells, modules and/or packs. A power control system is used to control power to/from the battery system during charging, propulsion and/or regeneration.

Current collectors of electrodes are connected to external tabs. Ultrasonic welding is a low-cost method for attaching the tabs to the electrodes. However, an outermost current collector of battery cells with tabs connected using ultrasonic welding may be torn or weakened during manufacturing. In some examples, the torn current collectors cause variations in cell resistance. The torn current collectors may also cause lithium plating.

SUMMARY

A battery cell includes a plurality of electrodes including a plurality of anode electrodes and a plurality of cathode electrodes. The plurality of electrodes is arranged in one of a stacked architecture and a winding architecture. Each of the plurality of electrodes includes a current collector and active material arranged on opposite sides of the current collector. The current collector of one or more outermost ones of the plurality of electrodes is thicker than the current collectors of remaining ones of the plurality of electrodes having the same anode/cathode type.

In other features, the plurality of electrodes is arranged in the stacked architecture. The one or more outermost ones of the plurality of electrodes comprises a first outermost one of the plurality of electrodes arranged on one side of the battery cell and a second outermost one of the plurality of electrodes arranged on the opposite side of the battery cell.

In other features, the plurality of electrodes is arranged in the stacked architecture. The one or more outermost ones of the plurality of electrodes comprises a first outermost one of the plurality of electrodes on one side of the battery cell and one of the plurality of electrodes arranged adjacent to the first outermost one of the plurality of electrodes.

In other features, the plurality of electrodes is arranged in the stacked architecture. The one or more outermost ones of the plurality of electrodes comprises a first outermost one of the plurality of electrodes and one of the plurality of electrodes arranged adjacent to the first outermost one of the plurality of electrodes and a second outermost one of the plurality of electrodes and one of the plurality of electrodes arranged adjacent to the second outermost one of the plurality of electrodes.

In other features, the plurality of electrodes is arranged in the winding architecture. The one or more outermost ones of the plurality of electrodes comprises a first outermost one of the plurality of electrodes arranged on one side of the battery cell and a second outermost one of the plurality of electrodes arranged on the opposite side of the battery cell.

In other features, the plurality of electrodes is arranged in the winding architecture. The one or more outermost ones of the plurality of electrodes comprises a first outermost one of the plurality of electrodes on one side of the battery cell and one of the plurality of electrodes arranged adjacent to the first outermost one of the plurality of electrodes.

In other features, the plurality of electrodes is arranged in the winding architecture. The one or more outermost ones of the plurality of electrodes comprises a first outermost one of the plurality of electrodes and one of the plurality of electrodes arranged adjacent to the first outermost one of the plurality of electrodes and a second outermost one of the plurality of electrodes and one of the plurality of electrodes arranged adjacent to the second outermost one of the plurality of electrodes.

In other features, the plurality of anode electrodes includes a plurality of first tabs, respectively, that are ultrasonically welded to an external anode tab. The plurality of cathode electrodes includes a plurality of second tabs, respectively, that are ultrasonically welded to an external cathode tab. The first tabs and the second tabs are located on a same side of the battery cell.

In other features, the plurality of anode electrodes includes a plurality of first tabs, respectively, that are ultrasonically welded to the external anode tab. The plurality of cathode electrodes includes a plurality of second tabs, respectively, that are ultrasonically welded to the external cathode tab. The first tabs and the second tabs are located on different sides of the battery cell.

In other features, the one or more outermost ones of the plurality of electrodes includes one or more of the plurality of cathode electrodes. The one more of the plurality of cathode electrodes includes a current collector having a thickness that is greater than 20 μm. Remaining ones of the plurality of cathode electrodes includes a current collector having a thickness that is less than 15 μm.

In other features, the one or more outermost ones of the plurality of electrodes includes one or more of the plurality of cathode electrodes. The one more of the plurality of cathode electrodes includes a current collector having a thickness that is greater than 25 μm. Remaining ones of the plurality of cathode electrodes includes a current collector having a thickness that is less than 12 μm.

In other features, the one or more outermost ones of the plurality of electrodes includes one or more of the plurality of anode electrodes. The one more of the plurality of anode electrodes includes a current collector having a thickness that is greater than 15 μm. Remaining ones of the plurality of anode electrodes includes a current collector having a thickness that is less than 10 μm.

In other features, the one or more outermost ones of the plurality of electrodes includes one or more of the plurality of anode electrodes. The one more of the plurality of anode electrodes includes a current collector having a thickness that is greater than 20 μm. Remaining ones of the plurality of anode electrodes includes a current collector having a thickness that is less than 8 μm.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an ultrasonic welding tool for welding tabs to current collectors;

FIG. 2A is a perspective view of battery cells in a stacked architecture with tabs on one side and including anode and/or cathode current collectors having different thicknesses according to the present disclosure;

FIGS. 2B and 2C are cross-sectional views of anodes and/or cathodes according to the present disclosure;

In the drawings, reference numbers may be reused to identify similar and/or identical elements.

DETAILED DESCRIPTION

Figure 3:
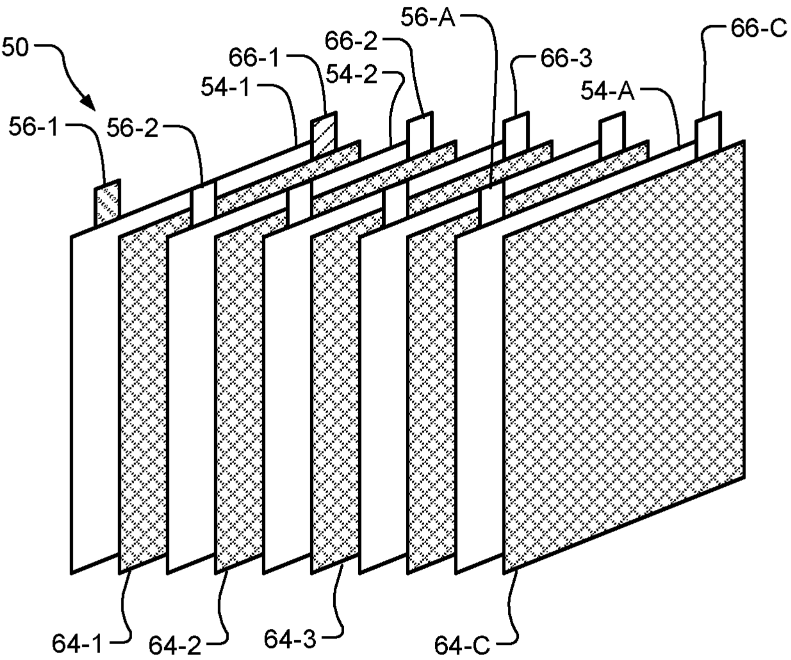
FIGS. 3 and 4 are perspective views of battery cells in a stacked architecture with tabs on one side and including anode and/or cathode current collectors having different thicknesses according to the present disclosure.

While the foregoing description relates to battery cells for battery systems of electric vehicles, the battery cells can be used to supply loads in non-vehicular applications.

Referring now to FIG. 1, an ultrasonic welding tool 1 is shown to include a power supply 2, a transceiver 3, a booster 4, a coupling 5, a sonotrode 6 including an end or horn 7, and an anvil 8. A workpiece 9 to be welded is placed between the end 7 and the anvil 8 and clamping force is applied during welding.

There are two kinds of tabs including current collector tabs and external tabs. Current collector tabs correspond to parts of current collectors that are free of electrode materials. They are used to collect/distribute current from/to each piece of current collector. External tabs are used to accumulate the currents from each current collector and build connections with modules. Therefore, the current collector tabs are welded to the external tabs. In some examples, the external tabs are made of aluminum (Al) plate (e.g., for cathodes) and nickel (Ni) plated copper (Cu) (e.g., for anodes). In some examples, the external tabs are thicker than the current collectors and thicker current collectors (described below) to tolerate the accumulated current.

Over-welding of current collectors to tabs is a common issue when ultrasonic welding is used. Over-welding causes cracking or tearing of outermost current collectors. In battery cells according to the present disclosure, one or more outermost electrodes (cathodes and/or anodes) of battery cells include thicker current collectors to reduce tearing.

The thicker current collectors avoid perforation of the current collectors by a knurl pattern and suppress sticking of current collectors to anvils and/or horns. The same strategy can also be applied to battery cells using a winding architecture. In some examples, thicker current collectors are used for the outermost electrodes on both sides of the battery cell. This approach reduces tearing at the horn side and sticking on the anvil side. This approach also allows welding with the horn arranged on either side of the battery cell.

Metals contact with each other and create adhesion as well as inter-diffusion across the interfaces under clamping force and heat generated by slipping vibrations of working pieces. Energy is proportional to a product of thickness and slipping vibration amplitude. Heat dissipation is proportional to thickness. In recent designs, to achieve high energy density, multilayer cell stacks with thin current collectors (e.g., 12 μm for Al and 8 μm for Cu) for the battery cells are used and require higher energy for welding. Thus, a higher slipping vibration amplitude is needed. The higher welding energy causes high temperature arising from friction force on an outer surface thereof and further causes defects (torn current collectors due to contact with the sharp knurl pattern and/or less strength under pulling stress).

Referring now to FIGS. 2A-4, battery cells are shown in a stacked architecture with tabs on one side. The battery cells include anode and cathode current collectors having different thicknesses. In FIG. 2A, a battery cell 10 has a stacked architecture and includes anodes 14-1, 14-2, 14-2, . . . , and 14-A including tabs 16-1, 16-2, . . . , and 16-A. The battery cell 10 includes cathodes 24-1, 24-2, . . . , and 24-A including tabs 26-1, 26-2, . . . , and 26-A.

In FIG. 2B, the anodes 14 comprise an anode current collector 40, anode material 42 arranged on opposite sides of the anode current collector 40, a conductive additive, and a binder. In FIG. 2C, the cathodes 24 comprise a cathode current collector 44, cathode active material 46 arranged on opposite sides of the cathode current collector 44, a conductive additive, and a binder.

Referring back to FIG. 2A, the anode current collector 40 of the anode 14-1 arranged on one side of the battery cell is thicker than the anode current collectors 40 of the other anodes 14-2, . . . , and 14-A. The cathode current collector 44 of the cathode 24-C arranged on the other side of the battery cell is thicker than the cathode current collectors 44 of the other cathodes 24-1, 24-2, . . . , and 24-(C-1).

In FIG. 3, a battery cell 50 has a stacked architecture and includes anodes 54-1, 54-2, . . . , and 54-A including tabs 56-1, 56-2, . . . , and 56-A. The battery cell 50 includes cathodes 64-1, 64-2, . . . , and 64-A including tabs 66-1, 66-2, 66-2, . . . , and 66-A.

The anode current collector 40 of the anode 54-1 is thicker than the anode current collectors 40 of the other anodes 54-2, . . . , and 54-A. The cathode current collector 44 of the cathode 64-1 (arranged adjacent to the anode 54-1) is thicker than the cathode current collectors 44 of the other cathodes 64-2, . . . , and 64-C.

Figure 4:
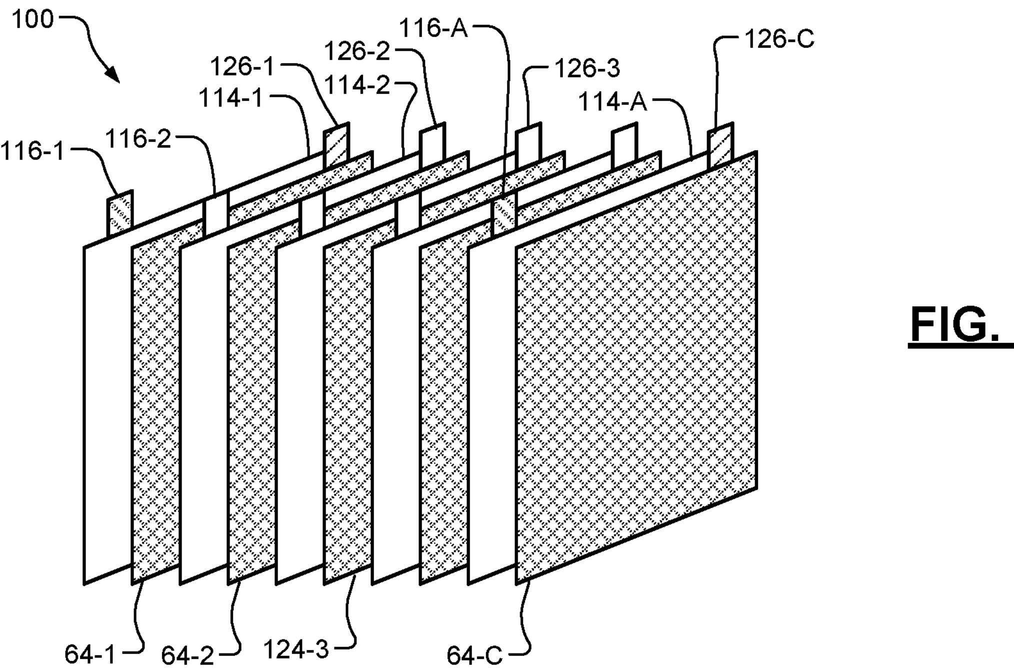

In FIG. 4, the battery cell 100 has a stacked architecture and includes anodes 114-1, 114-2, . . . , and 114-A including tabs 116-1, 116-2, . . . , and 116-A. The battery cell 100 includes cathodes 124-1, 124-2, . . . , and 124-A including tabs 126-1, 126-2, . . . , and 126-A.

The anode current collectors 40 of the anodes 114-1 and 114-A are thicker than the anode current collectors 40 of the other anodes 114-2, . . . , and 114-(A-1). The cathode current collectors 44 of the cathodes 124-1 and 124-C are thicker than the cathode current collectors 44 of the other cathodes 124-2, . . . , and 124-(C-1).

Figures 5, 6:
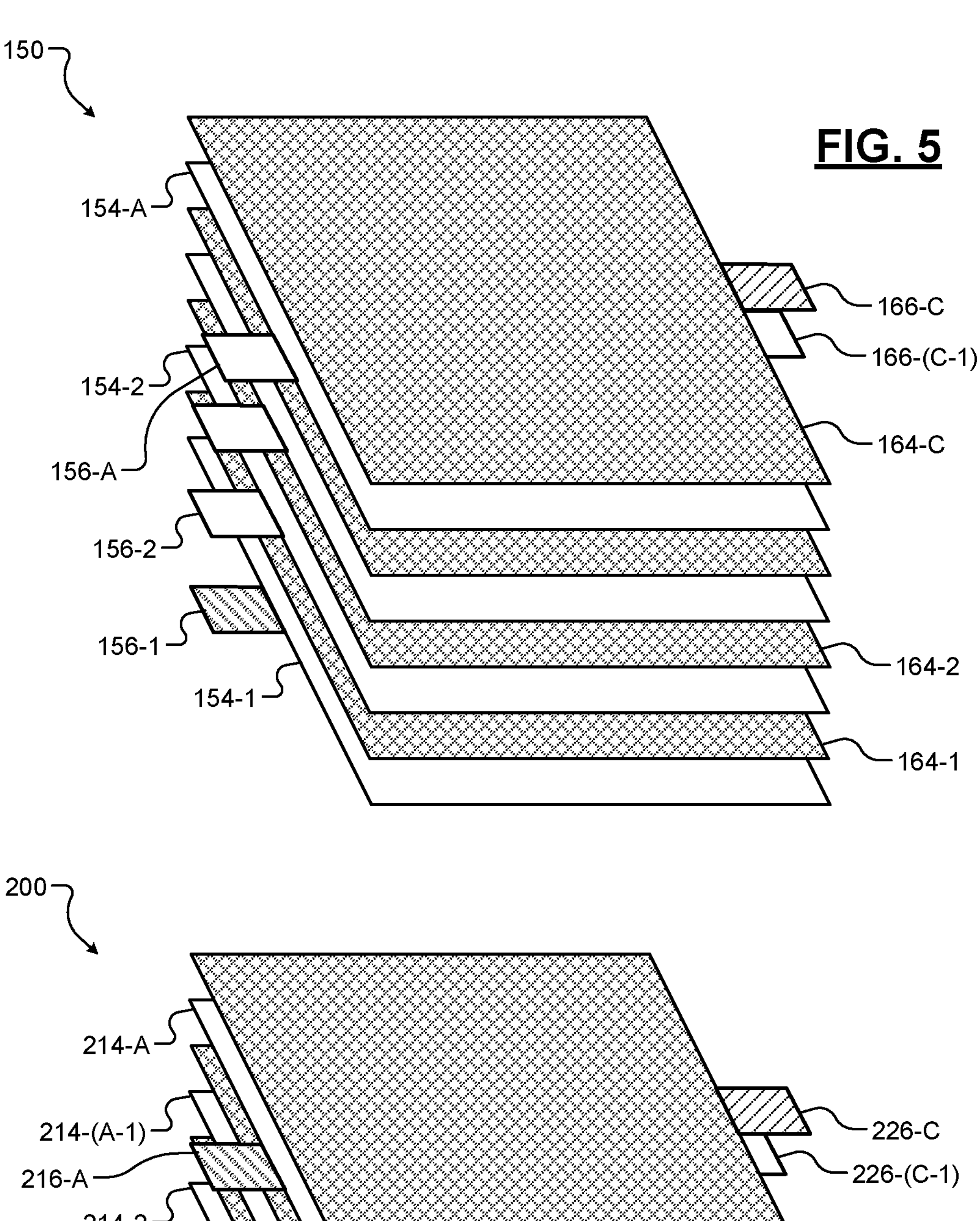
FIG. 5-7 are perspective views of battery cells in a winding architecture with tabs on opposite sides and including anode and/or cathode current collectors having different thicknesses according to the present disclosure.
Figure 7:
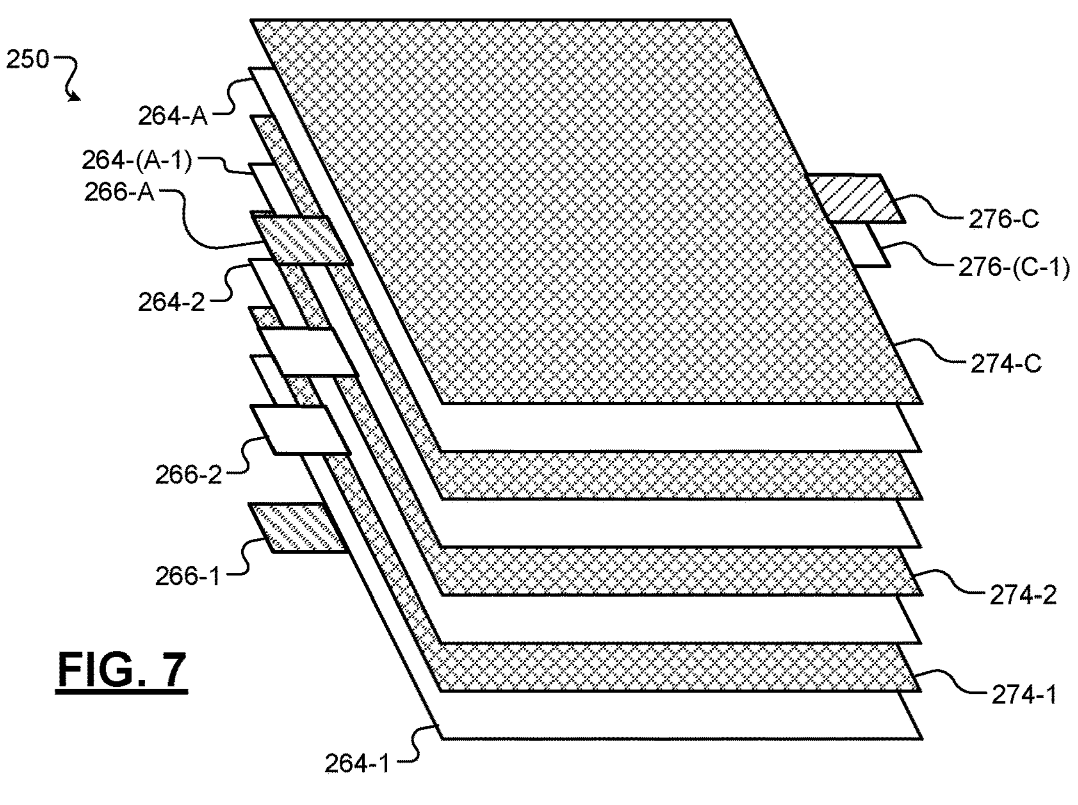

Referring now to FIG. 5-7, battery cells are shown in a stacked architecture with tabs on opposite sides and including anode and cathode current collectors having different thicknesses. In FIG. 5, the battery cell 150 has a stacked architecture and includes anodes 154-1, 154-2, . . . , and 154-A including tabs 156-1, 156-2, . . . , and 156-A. The battery cell 150 includes cathodes 164-1, 164-2, . . . , and 164-A including tabs 166-1, 166-2, . . . , and 166-A.

The anode current collector 40 of the anode 154-1 is thicker than the anode current collectors 40 of the other anodes 154-2, . . . , and 154-A. The cathode current collector 44 of the cathode 164-C is thicker than the cathode current collectors 44 of the other cathodes 164-1, 164-2, . . . , and 164-(C-1).

In FIG. 6, the battery cell 200 has a stacked architecture and includes anodes 214-1, 214-2, . . . , and 214-A including tabs 216-1, 216-2, . . . , and 216-A. The battery cell 200 includes cathodes 224-1, 224-2, . . . , and 224-C including tabs 226-1, 226-2, . . . , and 226-A.

The anode current collector 40 of the anode 214-A is thicker than the anode current collectors 40 of the other anodes 214-1, . . . , and 214-(A-1). The cathode current collector 44 of the cathode 224-C is thicker than the cathode current collectors 44 of the other cathodes 224-1, . . . , and 224-(C-1).

In FIG. 7, the battery cell 250 has a stacked architecture and includes anodes 264-1, 264-2, . . . , and 264-A including tabs 266-1, 266-2, . . . , and 266-A. The battery cell 250 includes cathodes 274-1, 274-2, . . . , and 274-C including tabs 276-1, 276-2, . . . , and 276-C.

The anode current collector 40 of the anodes 264-1 and 264-A are thicker than the anode current collectors 40 of the other anodes 264-2, . . . , and 264-(A-1). Cathode current collectors 44 of the cathode 274-1 and 274-C are thicker than the cathode current collectors 44 of the other cathodes 274-2, . . . , and 274-(C-1).

Figure 8:
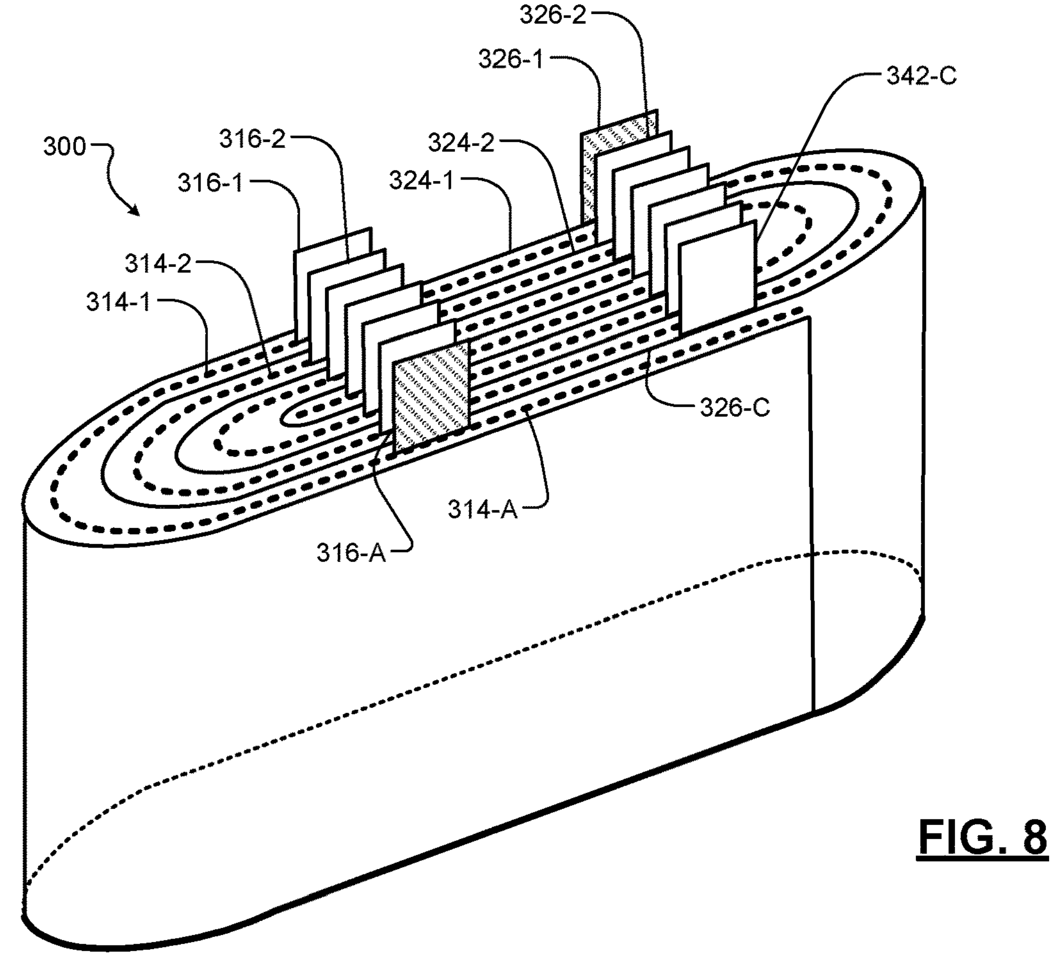
FIGS. 8-10 are perspective views of battery cells in a winding architecture with tabs on one side and including anode and/or cathode current collectors having different thicknesses according to the present disclosure.
Figures 9, 10:
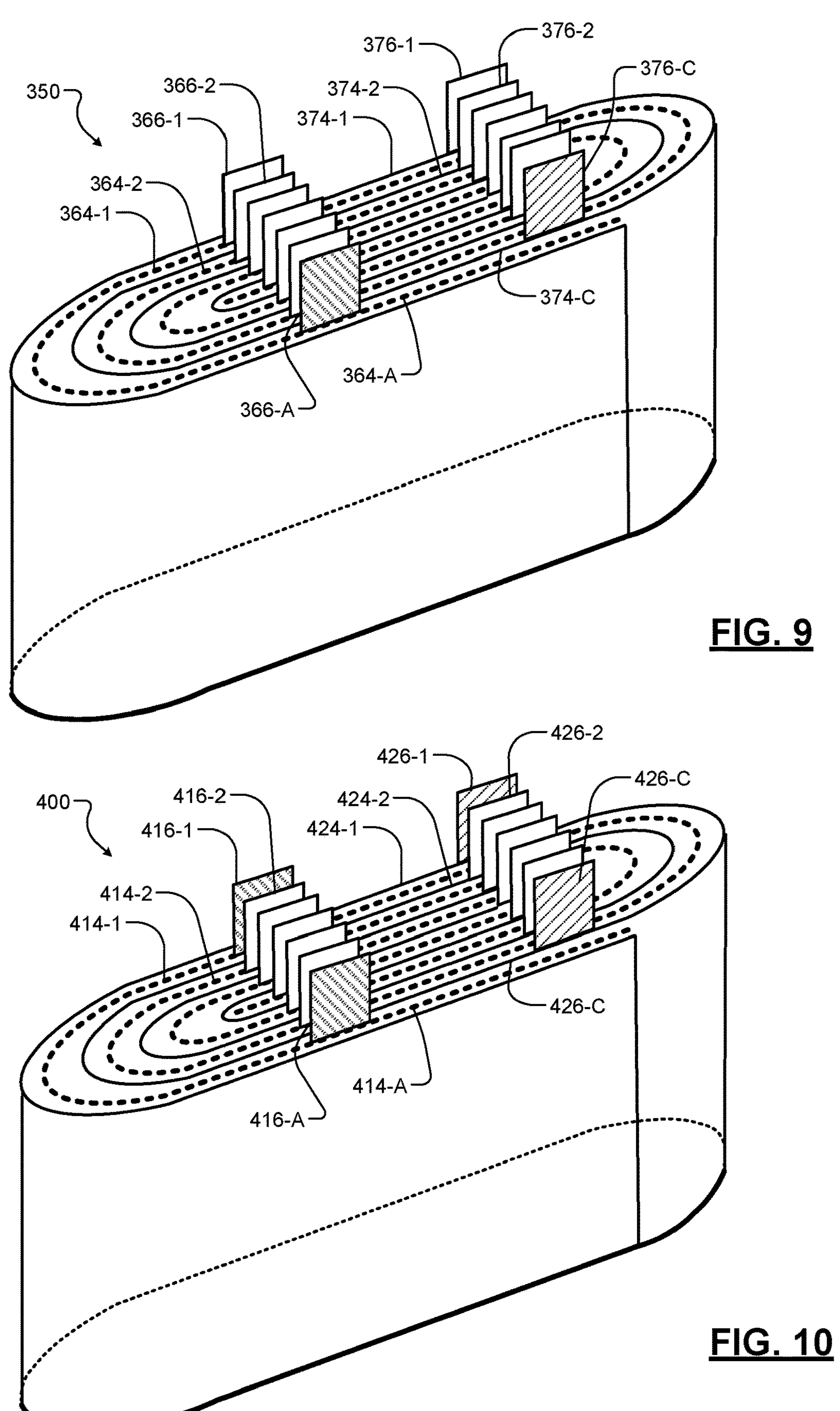

Referring now to FIGS. 8-10, battery cells in a winding architecture with tabs on one side and including anode and cathode current collectors having different thicknesses. In FIG. 8, the battery cell 300 has a winding architecture and includes anodes 314-1, 314-2, . . . , and 314-A including tabs 316-1, 316-2, . . . , and 316-A. The battery cell 300 includes cathodes 324-1, 324-2, . . . , and 324-A including tabs 326-1, 326-2, . . . , and 326-A. ss The anode current collector 40 of the anode 314-A is thicker than the anode current collectors 40 of the other anodes 314-1, . . . , and 314-(A-1). The cathode current collector 44 of the cathode 324-1 is thicker than the cathode current collectors 44 of the other cathodes 324-2, . . . , and 324-C. In FIG. 9, the battery cell 350 has a winding architecture and includes anodes 364-1, 364-2, . . . , and 364-A including tabs 366-1, 366-2, . . . , and 366-A. The battery cell 350 includes cathodes 374-1, 374-2, . . . , and 374-A including tabs 376-1, 376-2, . . . , and 376-A.

The anode current collector 40 of the anode 364-A is thicker than the anode current collectors 40 of the other anodes 364-1, . . . , and 364-(A-1). The cathode current collector 44 of the cathode 374-C is thicker than the cathode current collectors 44 of the other cathodes 374-1, . . . , and 374-(C-1).

In FIG. 10, the battery cell 400 has a winding architecture and includes anodes 414-1, 414-2, . . . , and 414-A including tabs 416-1, 416-2, . . . , and 416-A. The battery cell 400 includes cathodes 424-1, 424-2, . . . , and 424-A including tabs 426-1, 426-2, . . . , and 426-A.

The anode current collector 40 of the anodes 414-1 and 414-A are thicker than the anode current collectors 40 of the other anodes 414-2, . . . , and 414-(A-1). The cathode current collector 44 of the cathode 424-1 and 424-C are thicker than the cathode current collectors 44 of the other cathodes 424-2, . . . , and 424-(C-1).

Figure 11:
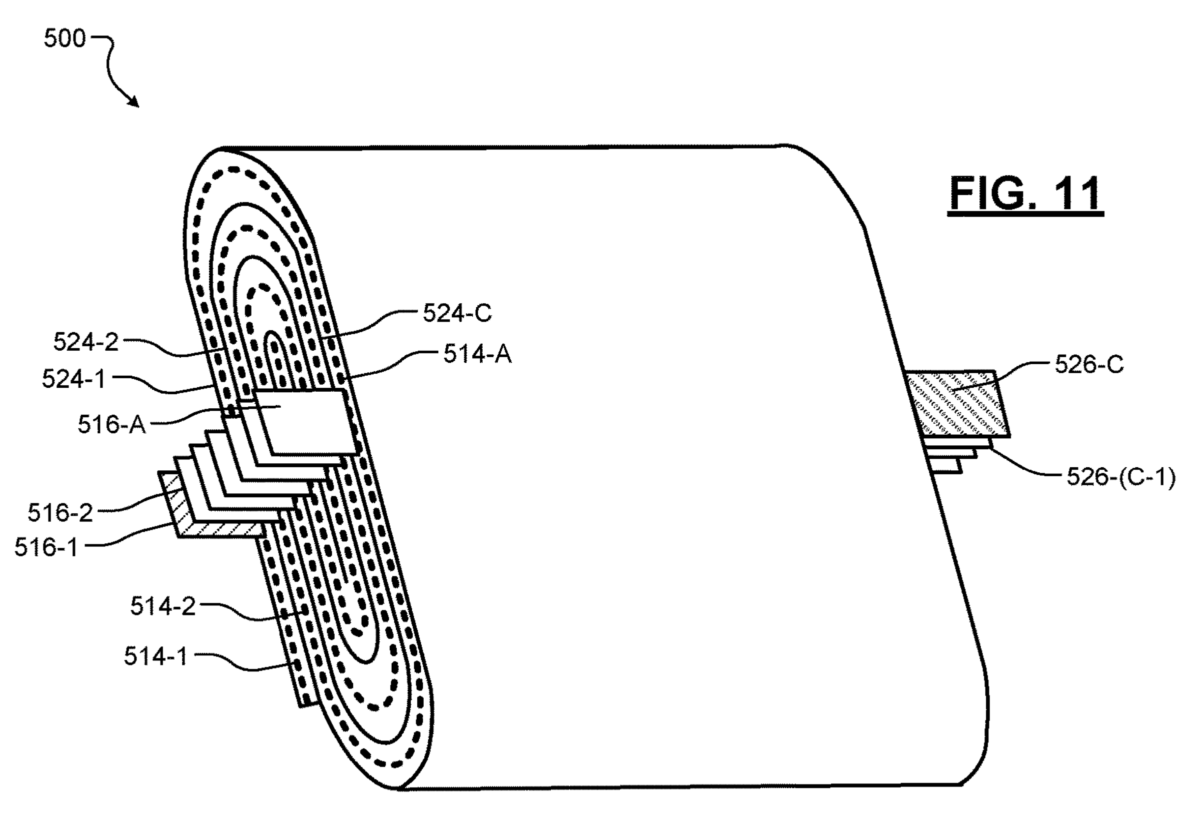
FIG. 11-13 are perspective views of battery cells in a stacked architecture with tabs on opposite sides and including anode and/or cathode current collectors having different thicknesses according to the present disclosure.
Figure 12:
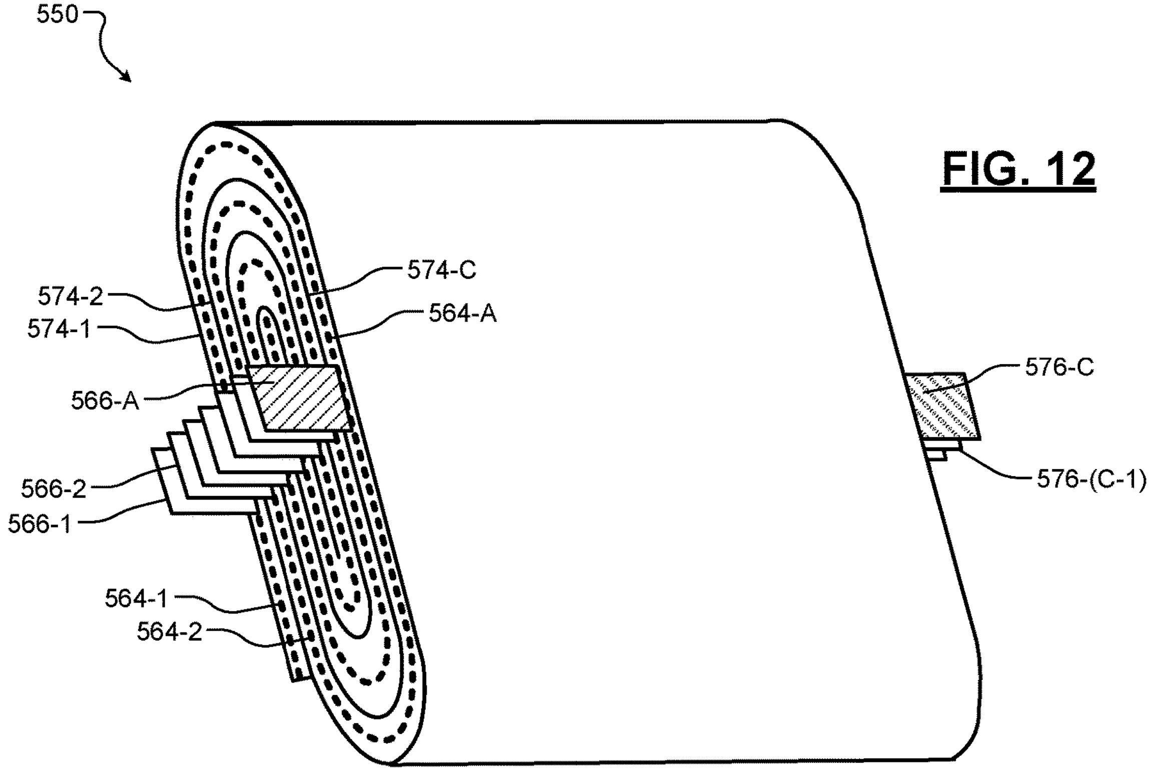
Figure 13:
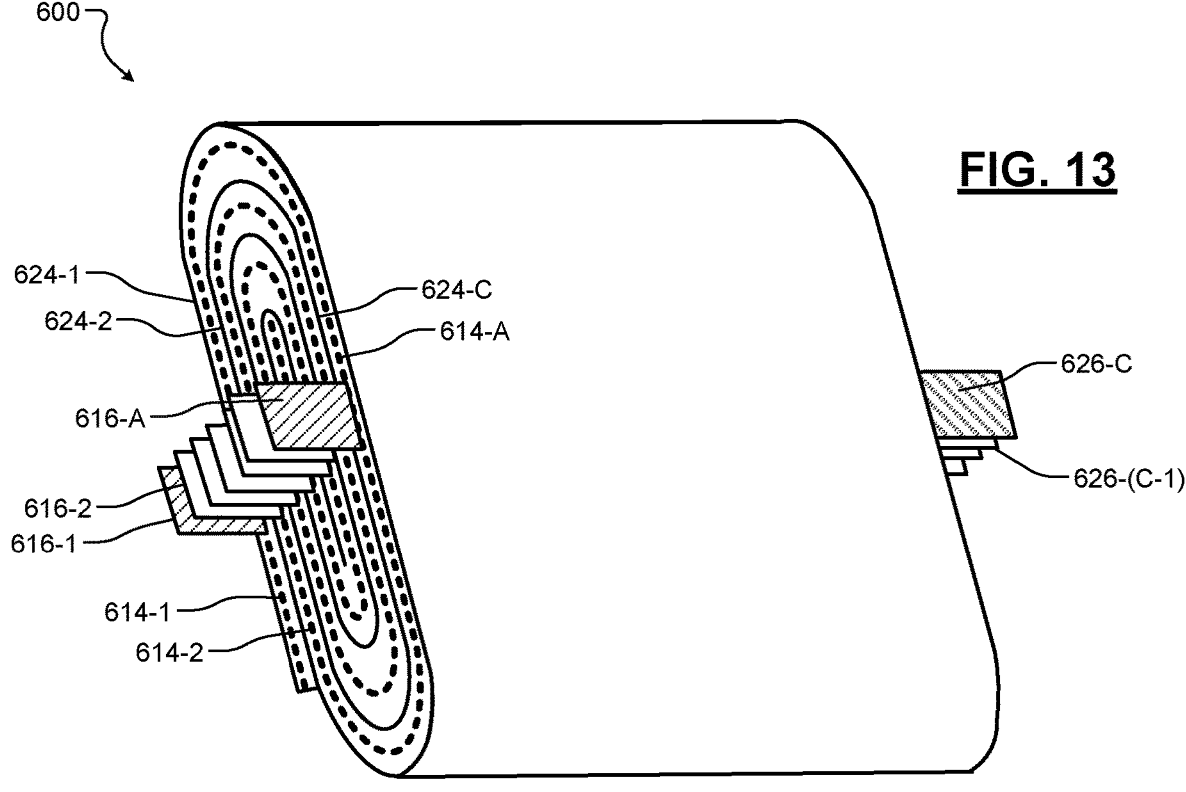

Referring now to FIG. 11-13, battery cells in a winding architecture with tabs on opposite sides and including anode and cathode current collectors having different thicknesses. In FIG. 11, the battery cell 500 has a winding architecture and includes anodes 514-1, 514-2, . . . , and 514-A including tabs 516-1, 516-2, 516-2, . . . , and 516-A. The battery cell 500 includes cathodes 524-1, 524-2, . . . , and 524-A including tabs 526-1, 526-2, . . . , and 526-A.

The anode current collector 40 of the anode 514-1 is thicker than the anode current collectors 40 of the other anodes 514-2, . . . , and 514-A. The cathode current collector 44 of the cathode 524-C is thicker than the cathode current collectors 44 of the other cathodes 564-1, 524-2, . . . , and 524-(C-1).

In FIG. 12, the battery cell 550 has a winding architecture and includes anodes 564-1, 564-2, . . . , and 564-A including tabs 566-1, 566-2, . . . , and 566-A. The battery cell 550 includes cathodes 574-1, 574-2, . . . , and 574-A including tabs 576-1, 576-2, . . . , and 576-A.

The anode current collector 40 of the anode 564-A is thicker than the anode current collectors 40 of the other anodes 564-1, . . . , and 564-(A-1). The cathode current collector 44 of the cathode 574-C is thicker than the cathode current collectors 44 of the other cathodes 574-1, . . . , and 574-(C-1).

In FIG. 13, the battery cell 600 has a winding architecture and includes anodes 614-1, 614-2, . . . , and 614-A including tabs 616-1, 616-2, . . . , and 616-A. The battery cell 600 includes cathodes 624-1, 624-2, . . . , and 624-A including tabs 626-1, 626-2, . . . , and 626-A.

The anode current collector 40 of the anodes 614-1 and 614-A are thicker than the anode current collectors 40 of the other anodes 614-2, . . . , and 614-(A-1). The cathode current collector 44 of the cathodes 624-1 and 624-C are thicker than the cathode current collectors 44 of the other cathodes 624-2, . . . , and 624-(C-1).

For wound battery cells with tabs on opposite sides, a width of the battery cell is equal to D3. A width of tabs for electrodes having thicker current collectors is equal to D1. A width of tabs of the battery cell for electrodes having thinner current collectors is equal to D2. In some examples, D1≤D2≤D3.

In some examples, each cathode comprises a cathode active material (30~98 wt %), a conductive additive (0~30 wt %) mixed with a binder (0~20 wt %) and arranged on opposite sides of a current collector (e.g., Al) having a thickness is a range from 1 μm to 1000 μm.

In some examples, the cathode active material comprises at least one of spinel (e.g., $LiMn_2O_4$, $LiNi_{0.5}Mn_{1.5}O_4$), $LiFePO_4$, rock salt layered oxides ($LiCoO_2$, $LiNi_xMn_yCo_{1-x-y}O_2$, $LiNi_xCo_yAl_{1-x-y}O_2$, $LiNi_xMn_{1-x}O_2$, $Li_{1+x}MO_2$), phosphates ($LiMn_xFe_{1-x}PO_4$, $LiVOPO_4$, $Li_2VOPO_4$, $Li_3V_2(PO_4)_3$ etc.) and other lithium transition-metal oxides. In some examples, the cathode active material comprises surface-coated and/or doped cathode materials. e.g., $LiNbO_3$ coating, carbon coating and non-metal doping.

In some examples the conductive additive is selected from a group consisting of carbon black, graphite, graphene, graphene oxide, Super P, acetylene black, carbon nanofibers, carbon nanotubes and other electronically conductive additives.

In some examples, the binder is selected from a group consisting of poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS) and other types of binders.

In some examples, the cathode current collector comprises at least one of aluminum (Al), nickel (Ni), stainless steel, or other metal. In some examples, the normal cathode current collector has a thickness less than 15 μm. In some examples, the normal cathode current collector has a thickness less than 12 μm. In some examples, the thick cathode current collector has a thickness greater than 20 μm. In some examples, the thick cathode current collector has a thickness greater than 25 μm.

In some examples, the anode layer comprises an anode current collector (e.g., Cu), anode material arranged on opposite sides of the anode current collector (0~99.5 wt %), and binders (0.01~20 wt %). In some examples, the anode layer has a thickness in a range from 1 μm to 1000 μm.

In some examples, the anode materials are selected from a group consisting of: a) Si-based materials (e.g. Si, $SiO_x$, Si/C, $SiO_x$/C . . . ); b) Carbonaceous material (e.g. graphite, hard carbon, soft carbon . . . ); c) Metal and metal alloys (e.g., Li, Sn . . . ); d) Metal oxide (e.g. $SnO_2$, $Fe_3O_4$ . . . ) or other suitable anode materials.

In some examples, the conductive additive (0~30 wt %) is selected from a group consisting of carbon black, graphite, graphene, graphene oxide, Super P, acetylene black, carbon nanofibers, carbon nanotubes and other electronically conductive additives, e.g., PANi, PPy In some examples, the anode layer may further include other binders (0~20 wt %) selected from a group consisting of bare alginate salts, sodium carboxymethyl cellulose (CMC), styrene-butadiene rubber (SBR), poly(tetrafluoroethylene) (PTFE), poly(vinylidene fluoride) (PVDF), nitrile butadiene rubber (NBR), styrene ethylene butylene styrene copolymer (SEBS), styrene butadiene styrene copolymer (SBS) and other suitable binders.

In some examples, the anode current collector comprises at least one of Cu, Ni, stainless steel etc.

In some examples, the normal anode current collector has a thickness less than 10 μm. In some examples, the normal anode current collector has a thickness less than 8 μm. In some examples, the thick anode current collector has a thickness greater than 15 μm. In some examples, the thick anode current collector has a thickness greater than 20 μm.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A battery cell comprising:

a plurality of electrodes including:

a plurality of anode electrodes; and a plurality of cathode electrodes, the plurality of electrodes is arranged in one of a stacked architecture and a winding architecture;

each of the plurality of electrodes includes a current collector and active material arranged on both sides of the current collector;

the current collector of one or more outermost ones of the plurality of anode electrodes is thicker than the current collectors of remaining ones of the plurality of anode electrodes; and the current collector of one or more outermost ones of the plurality of cathode electrodes is thicker than the current collectors of remaining ones of the plurality of cathode electrodes.

2. The battery cell of claim 1, wherein:

the plurality of electrodes is arranged in the stacked architecture;

the one or more outermost ones of the plurality of anode electrodes comprises a first outermost one of the plurality of anode electrodes arranged on a first side of the battery cell and a second outermost one of the plurality of anode electrodes arranged on a second side of the battery cell that is opposite to the first side; and the one or more outermost ones of the plurality of cathode electrodes comprises a first outermost one of the plurality of cathode electrodes arranged on the first side of the battery cell and a second outermost one of the plurality of cathode electrodes arranged on the second side of the battery cell.

3. The battery cell of claim 1, wherein:
the plurality of electrodes is arranged in the stacked architecture;
the one or more outermost ones of the plurality of anode electrodes comprises a first outermost one of the plurality of anode electrodes on a first side of the battery cell and one of the plurality of anode electrodes arranged adjacent to the first outermost one of the plurality of anode electrodes; and
the one or more outermost ones of the plurality of cathode electrodes comprises a first outermost one of the plurality of cathode electrodes on the first side of the battery cell and one of the plurality of cathode electrodes arranged adjacent to the first outermost one of the plurality of cathode electrodes.

4. The battery cell of claim 1, wherein:
the plurality of electrodes is arranged in the stacked architecture;
the one or more outermost ones of the plurality of anode electrodes comprises:
a first outermost one of the plurality of anode electrodes and one of the plurality of anode electrodes arranged adjacent to the first outermost one of the plurality of anode electrodes; and
a second outermost one of the plurality of anode electrodes and one of the plurality of anode electrodes arranged adjacent to the second outermost one of the plurality of anode electrodes;
the one or more outermost ones of the plurality of cathode electrodes comprises:
a first outermost one of the plurality of cathode electrodes and one of the plurality of cathode electrodes arranged adjacent to the first outermost one of the plurality of cathode electrodes; and
a second outermost one of the plurality of cathode electrodes and one of the plurality of cathode electrodes arranged adjacent to the second outermost one of the plurality of cathode electrodes.

5. The battery cell of claim 1, wherein:
the plurality of electrodes is arranged in the winding architecture;
the one or more outermost ones of the plurality of anode electrodes comprises a first outermost one of the plurality of anode electrodes arranged on a first side of the battery cell and a second outermost one of the plurality of anode electrodes arranged on a second side of the battery cell that is opposite to the first side; and
the one or more outermost ones of the plurality of cathode electrodes comprises a first outermost one of the plurality of cathode electrodes arranged on the first side of the battery cell and a second outermost one of the plurality of cathode electrodes arranged on the second side of the battery cell.

6. The battery cell of claim 1, wherein:
the plurality of electrodes is arranged in the winding architecture;
the one or more outermost ones of the plurality of anode electrodes comprises a first outermost one of the plurality of anode electrodes on a first side of the battery cell and one of the plurality of anode electrodes arranged adjacent to the first outermost one of the plurality of anode electrodes; and
the one or more outermost ones of the plurality of cathode electrodes comprises a first outermost one of the plurality of cathode electrodes on the first side of the battery cell and one of the plurality of cathode electrodes arranged adjacent to the first outermost one of the plurality of cathode electrodes.

7. The battery cell of claim 1, wherein:
the plurality of electrodes is arranged in the winding architecture;
the one or more outermost ones of the plurality of anode electrodes comprises:
a first outermost one of the plurality of anode electrodes and one of the plurality of anode electrodes arranged adjacent to the first outermost one of the plurality of anode electrodes; and
a second outermost one of the plurality of anode electrodes and one of the plurality of anode electrodes arranged adjacent to the second outermost one of the plurality of anode electrodes;
the one or more outermost ones of the plurality of cathode electrodes comprises:
a first outermost one of the plurality of cathode electrodes and one of the plurality of cathode electrodes arranged adjacent to the first outermost one of the plurality of cathode electrodes; and
a second outermost one of the plurality of cathode electrodes and one of the plurality of cathode electrodes arranged adjacent to the second outermost one of the plurality of cathode electrodes.

8. The battery cell of claim 1, wherein:
the plurality of anode electrodes includes a plurality of first tabs, respectively, that are ultrasonically welded to an external anode tab;
the plurality of cathode electrodes includes a plurality of second tabs, respectively, that are ultrasonically welded to an external cathode tab; and
the first tabs and the second tabs are located on a same side of the battery cell.

9. The battery cell of claim 8, wherein:
the plurality of anode electrodes includes a plurality of first tabs, respectively, that are ultrasonically welded to the external anode tab;
the plurality of cathode electrodes includes a plurality of second tabs, respectively, that are ultrasonically welded to the external cathode tab; and
the first tabs and the second tabs are located on different sides of the battery cell.

10. The battery cell of claim 1, wherein:
the current collector of one or more of the outermost ones of the plurality of cathode electrodes has a thickness that is greater than 20 μm; and
the current collector of remaining ones of the plurality of cathode electrodes has a thickness that is less than 15 μm.

11. The battery cell of claim 1, wherein:
the current collector of one or more of the outermost ones of the plurality of cathode electrodes has a thickness that is greater than 25 μm; and
the current collector of remaining ones of the plurality of cathode electrodes has a thickness that is less than 12 μm.

12. The battery cell of claim 1, wherein:
the current collector of one or more of the outermost ones of the plurality of anode electrodes has a thickness that is greater than 15 μm; and
the current collector of remaining ones of the plurality of anode electrodes has a thickness that is less than 10 μm.

13. The battery cell of claim 1, wherein:
the current collector of one or more of the outermost ones of the plurality of anode electrodes has a thickness that is greater than 20 μm; and the current collector of remaining ones of the plurality of anode electrodes has having a thickness that is less than 8 μm.

14. A battery cell comprising:

a plurality of electrodes including:

a plurality of anode electrodes; and a plurality of cathode electrodes;

the plurality of electrodes is arranged in a stacked architecture;

each of the plurality of electrodes includes a current collector and active material arranged on both sides of the current collector;

the plurality of anode electrodes includes a plurality of first tabs, respectively, that are ultrasonically welded to an external anode tab;

the plurality of cathode electrodes includes a plurality of second tabs, respectively, that are ultrasonically welded to an external cathode tab;

the first tabs and the second tabs are located on one of a same side of the battery cell and different sides of the battery cell;

the current collector of one or more outermost ones of the plurality of anode electrodes is thicker than the current collectors of remaining ones of the plurality of anode electrodes; and the current collector of one or more outermost ones of the plurality of cathode electrodes is thicker than the current collector of remaining ones of the plurality of cathode electrodes.

15. The battery cell of claim 14, wherein:

the current collector of one or more of the outermost ones of the plurality of cathode electrodes has a thickness that is greater than 20 μm; and the current collector of remaining ones of the plurality of cathode electrodes has a thickness that is less than 15 μm.

16. The battery cell of claim 14, wherein:

the current collector of one or more of the outermost ones of the plurality of anode electrodes has a thickness that is greater than 15 μm; and the current collector of remaining ones of the plurality of anode electrodes has a thickness that is less than 10 μm.

17. A battery cell comprising:

a plurality of electrodes including:

a plurality of anode electrodes; and a plurality of cathode electrodes;

the plurality of electrodes is arranged in one of a winding architecture;

each of the plurality of electrodes includes a current collector and active material arranged on both sides of the current collector; and the plurality of anode electrodes includes a plurality of first tabs, respectively, that are ultrasonically welded to an external anode tab;

the plurality of cathode electrodes includes a plurality of second tabs, respectively, that are ultrasonically welded to an external cathode tab;

the first tabs and the second tabs are located on one of a same side of the battery cell and different sides of the battery cell;

the current collector of one or more outermost ones of the plurality of anode electrodes is thicker than the current collectors of remaining ones of the plurality of anode electrodes; and the current collector of one or more outermost ones of the plurality of cathode electrodes is thicker than the current collector of remaining ones of the plurality of cathode electrodes.

18. The battery cell of claim 17, wherein:

the current collector of one or more of the outermost ones of the plurality of cathode electrodes has a thickness that is greater than 20 μm; and the current collector of remaining ones of the plurality of cathode electrodes has a thickness that is less than 15 μm.

19. The battery cell of claim 17, wherein:

the current collector of one or more of the outermost ones of the plurality of anode electrodes has a thickness that is greater than 15 μm; and the current collector of remaining ones of the plurality of anode electrodes has a thickness that is less than 10 μm.

* * * * *